X0009759
Houston, Hinman & Ingraham,
Dry Dock,
Patented June 22, 1836
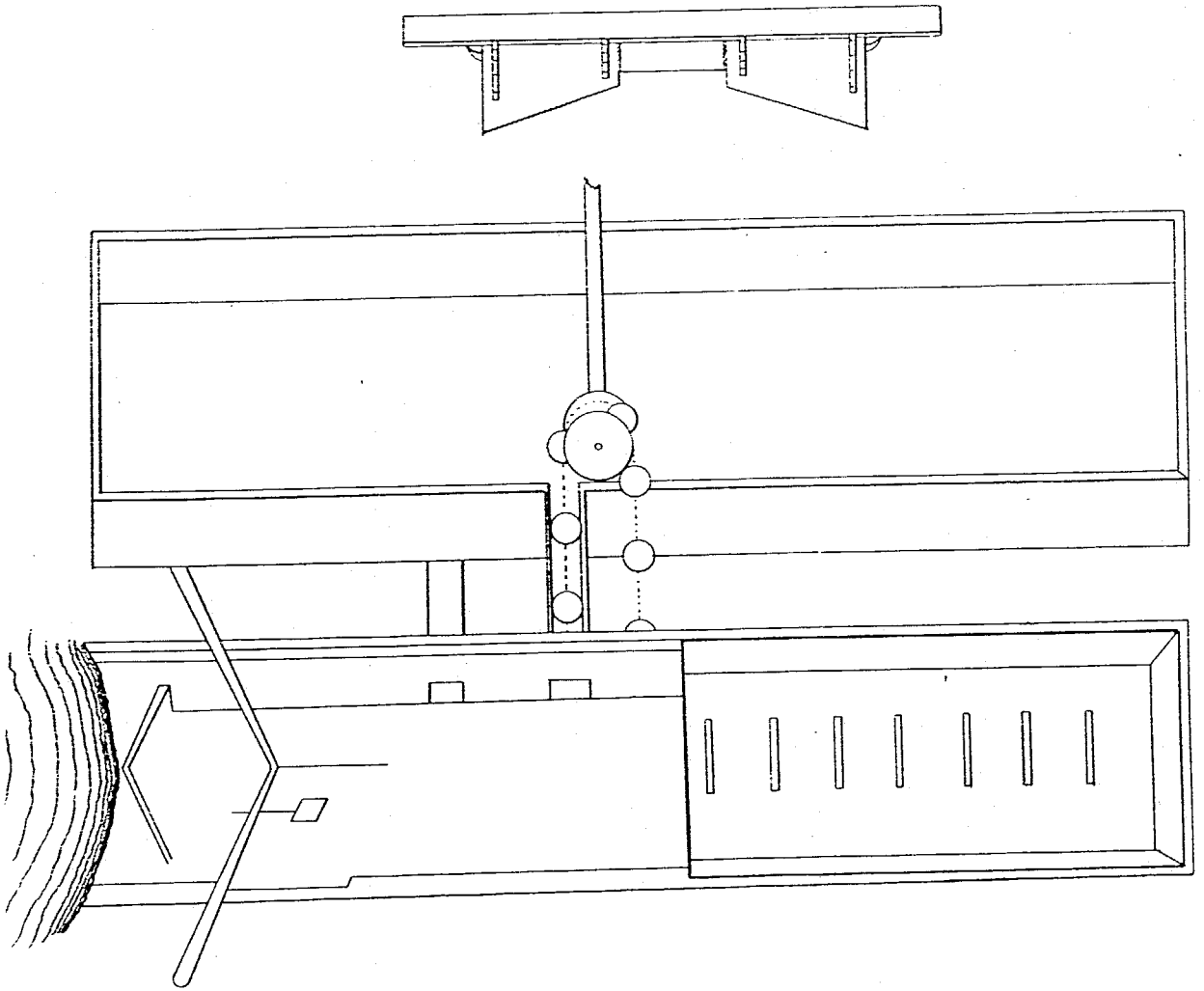
N. PETERS, PHOTO-LITHOGRAPHER, WASHINGTON, D. C.

9759X

June 22. 1836 401.

Joel Houston Anson Hinman and Jonas Ingraham
Letters Patent

The schedule referred to in these Letters Patent and making part of the same containing a description in the words of the said Joel Houston, Anson Hinman, and Jonas Ingraham themselves of their improvement in the Dry Dock.

To all to whom these presents shall come. Joel Houston Anson Hinman and Jonas Ingraham of the City of Buffalo, County of Erie and State of New York send greeting. Be it known that we the said Joel Houston Anson Hinman and Jonas Ingraham have invented a new and useful improvement, not known or used before in the making of a newly constructed Dry Dock by which a very important advantage is gained over the dry docks or rail ways now in use for repairing vessels, boats or other naval craft. This improvement consists in having a large reservoir placed a convenient distance from the sides of the lock the floor or bottom, of which reservoir to be on a level with the tops or coping of the sides of the lock, and which reservoir is to be filled, by means of a pump from the water below or on the floor of the lock. From the side of said reservoir is a conductor or penstock, leading the water from the reservoir into the lock, to raise the vessel high enough to float the same on the cradle, after the vessel shall have been brought on the centre of the cradle. The cradle is composed of a centre stationary block and slide blocks which are movable with a hand inserted in the outer ends of each slide block to operated in cog teeth. The flood gates are then to be hoisted which draws the water from the cradle and leaves the vessel and cradle dry. While the vessel is repairing the reservoir is to be filled again after the vessel is repaired. the gates are to be closed and the lock is to be filled by taking the water from the reservoir by means of the penstock as be-
fore.

9759X fore sufficient to float the vessel from the cradle into the lock then by hoisting the flume gates the vessel comes down by which time the lock gates are open and the vessel set afloat.

We claim the invention of a new principle in the applica-tion of an elevated reservoir, to be filled with water and to be used in raising or letting down vessels boats or other craft as an improvement upon the methods of raising vessels heretofore used. also the improvement of the slide blocks by means of a hand in each slide block dropping into cog teeth set in a groove. In witness whereof we we have hereunto set subscribed our names the eleventh day of January A.D. 1836.

Witnesses
Lowell Chapin
A.H. Palmer

Joel Houston
Anson Hinman
Jonas Ingraham

Drawing

Exd.
W.H.

473 wds